(12) United States Patent
Wu et al.

(10) Patent No.: US 7,739,110 B2
(45) Date of Patent: Jun. 15, 2010

(54) MULTIMEDIA DATA MANAGEMENT BY SPEECH RECOGNIZER ANNOTATION

(75) Inventors: Chung-Hsien Wu, Tainan (TW); Yu-Sheng Lai, Tainan (TW); Chien-Lin Huang, Kaohsiung (TW); Chia-Hao Kang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 702 days.

(21) Appl. No.: 11/565,628

(22) Filed: Dec. 1, 2006

(65) Prior Publication Data

US 2007/0288237 A1 Dec. 13, 2007

(30) Foreign Application Priority Data

Jun. 7, 2006 (TW) ................................ 95120209 A

(51) Int. Cl.
*G10L 15/00* (2006.01)
*G10L 15/08* (2006.01)
*G06F 17/30* (2006.01)

(52) U.S. Cl. .................. 704/235; 704/239; 704/243; 707/3

(58) Field of Classification Search .................. 704/231, 704/236, 239, 243, 245, 255, 270, 235; 707/3
See application file for complete search history.

(56) References Cited

U.S. PATENT DOCUMENTS

| | | | | |
|---|---|---|---|---|
| 4,087,630 A * | 5/1978 | Browning et al. | ........... | 704/236 |
| 4,624,011 A * | 11/1986 | Watanabe et al. | ........... | 704/254 |
| 4,677,672 A * | 6/1987 | Ukita et al. | .................. | 704/239 |
| 4,718,092 A * | 1/1988 | Klovstad | .................... | 704/239 |
| 4,718,093 A * | 1/1988 | Brown | ......................... | 704/243 |
| 4,903,305 A * | 2/1990 | Gillick et al. | ................ | 704/245 |
| 4,903,306 A * | 2/1990 | Nakamura | .................. | 704/247 |
| 5,532,936 A * | 7/1996 | Perry | .......................... | 702/76 |
| 5,625,749 A * | 4/1997 | Goldenthal et al. | .......... | 704/254 |
| 5,679,001 A * | 10/1997 | Russell et al. | ................ | 434/185 |
| 5,835,667 A | 11/1998 | Wactlar et al. | ................ | 386/96 |
| 6,061,652 A * | 5/2000 | Tsuboka et al. | ............. | 704/245 |
| 6,185,527 B1 | 2/2001 | Petkovic et al. | ............. | 704/231 |
| 6,243,713 B1 * | 6/2001 | Nelson et al. | ............. | 707/104.1 |
| 6,397,181 B1 | 5/2002 | Li et al. | ....................... | 704/256 |

(Continued)

FOREIGN PATENT DOCUMENTS

JP 2002-49559 A 2/2002

(Continued)

OTHER PUBLICATIONS

Visually Searching the Web for Content; John R. Smith and Shih-Fu Chang Jul.-Sep. 1997 IEEE; p. 12-20.

(Continued)

*Primary Examiner*—Martin Lerner

(57) ABSTRACT

A method and an apparatus for multimedia data management are disclosed. The method provides an indexing and retrieval scheme for digital photos with speech annotations based on image-like patterns transformed from the recognized syllable candidates. For annotated spoken content, the recognized n-best syllable candidates are transformed into a sequence of syllable-transformed patterns. Eigen-image analysis is further adopted to extract the significant information to reduce the dimensionality. Vector quantization is applied to quantize the syllable-transformed patterns into feature vectors for indexing. The invention of indexing scheme reduces the dimensionality and noise of data, and achieves better performance of 16.26% for speech annotated photo retrieval.

9 Claims, 8 Drawing Sheets

U.S. PATENT DOCUMENTS

| | | | |
|---|---|---|---|
| 6,449,595 B1* | 9/2002 | Arslan et al. | 704/235 |
| 6,499,016 B1 | 12/2002 | Anderson | 704/275 |
| 6,542,869 B1* | 4/2003 | Foote | 704/500 |
| 6,684,185 B1* | 1/2004 | Junqua et al. | 704/243 |
| 6,813,618 B1 | 11/2004 | Loui et al. | 707/5 |
| 6,833,865 B1 | 12/2004 | Fuller et al. | 348/231.2 |
| 7,171,360 B2* | 1/2007 | Huang et al. | 704/245 |
| 7,181,398 B2* | 2/2007 | Thong et al. | 704/254 |
| 7,366,656 B2* | 4/2008 | Furst-Yust et al. | 704/200.1 |
| 7,574,360 B2* | 8/2009 | Wu et al. | 704/260 |
| 2002/0038294 A1* | 3/2002 | Matsugu | 706/20 |
| 2003/0177108 A1* | 9/2003 | Charlesworth et al. | 707/1 |
| 2006/0095264 A1* | 5/2006 | Wu et al. | 704/260 |
| 2007/0174055 A1* | 7/2007 | Chengalvarayan et al. | 704/251 |
| 2009/0157402 A1* | 6/2009 | Lin et al. | 704/254 |

FOREIGN PATENT DOCUMENTS

| | | |
|---|---|---|
| JP | 2006-58874 A | 3/2006 |

OTHER PUBLICATIONS

An Active Learning Framework for Content-Based Information Retrieval; Cha Zhang, Student Member, IEEE, and Tsuhan Chen, Member, IEEE IEEE Transactions on Multimedia, vol. 4, No. 2, Jun. 2002; p. 260-268.

Personalized Video Summary Using Visual Semantic Annotations and Automatic Speech Transcriptions Belle L. Tseng and Ching-Yung Lin; 2002 IEEE, p. 5-8.

Building Personal Digital Photograph Libraries: An Approach with Ontology-Based MPEG-7 Dozen Dimensional Digital Content Architectur; Pei-Jeng Kuo Terumasa Aoki Hiroshi Yasuda; Proceedings of the Computer Graphics International; 2004 IEEE; p. 1-5.

Semantic Video Summarization Using Mutual Reinforcement Principle and Shot Arrangement Patterns Shi Lu, Michael R. Lyu and Irwin King; Proceedings of the 11$^{th}$ International Multimedia Modeling Conference(MMM'05); 2005 IEEE.

Transcriber: Development and use of a tool for assisting speech corpora production; Claude Barras, Edouard Geoffrois, Zhibiao Wu, Mark Liberman; Accepted Aug. 2, 2000; 2001 Elsevier Science B.V.; p. 5-22.

* cited by examiner

Non-Linear Relation between Original Syllable Pairs

Linear Distance Relation Representing Color Depth of Gray Level of an Image

Space Coordinate Transformation

FIG. 7A
jiao ... huo xue
FIG. 7B
jiao ... wo xue
qiao   huo xuan
jiang  guo xu
diao   wu  que
tiao   luo xun
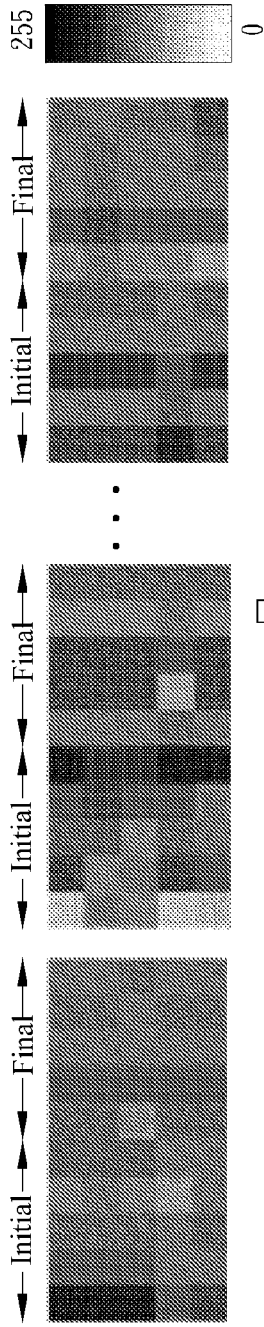
FIG. 7C
255
0
← Initial → ← Final →
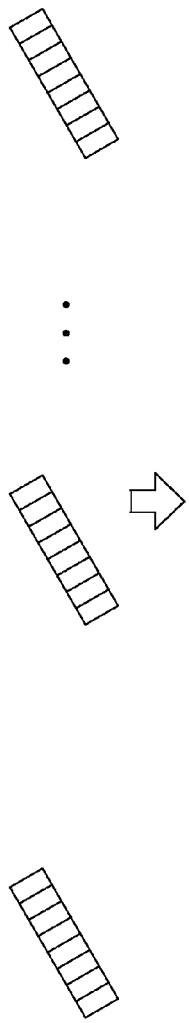
FIG. 7D
FIG. 7E
1   2   ...   8

MULTIMEDIA DATA MANAGEMENT BY SPEECH RECOGNIZER ANNOTATION

FIELD OF THE INVENTION

The present invention relates to a method and an apparatus for multimedia data management by using syllable-transformed images in speech annotation and retrieval of multimedia data.

BACKGROUND OF THE INVENTION

The rapid growth of Internet and the popularity of digital image capture devices, such as digital video camera, digital camera, and digital video recorder, provide more channels for the user to easily obtain multimedia data. As the user acquires more multimedia data, the difficulty of multimedia data management also increases.

Although there exist several multimedia data management methods and systems, most of the existent methods and systems use text or language-to-text to describe, index and retrieve the multimedia data. The current multimedia data annotation and search technologies can be categorized as four types: text-based annotation and search, speech-to-text-based annotation and search, graphical analysis search, and speech annotation and search.

The text-based annotation and search method is simple, but has the disadvantages of requiring long text input and being constrained by the system keywords in the annotation and search process. U.S. Pat. No. 6,833,865 disclosed an embedded metadata engine in digital capture devices. By adding the image content analysis function to the digital image capture device, the extra information related to the contents can be automatically generated through the image content analysis function, and stored with the original image data. However, this patent is only suitable for dynamically generating annotation for the image, but did not disclose any method for searching images.

The speech-to-text-based method requires speech recognition device, which leads to the language-related constraints. U.S. Pat. No. 6,397,181 disclosed a method and apparatus for voice annotation and retrieval of multimedia data. The speech input is used in annotation, and a speech recognition technique is used to transform the speech into text. The text annotation is used to generate a reverse index table. The search also uses speech input, which is used to generate a search keyword through speech recognition technique. The reverse index table is then used to find the matching multimedia data.

U.S. Pat. No. 6,499,016 disclosed a method for automatically storing and presenting digital images using a speech-based command language. The speech-to-text approach is used in annotation, and the text is used in search. The user can use the speech to annotate the picture in real-time when using a digital camera. With a plurality of commands, statement speech input, the annotation, such as time and place, can be sent to the server with the image. The server uses speech recognition to transform the speech to the text for storage. Based on the text annotation, the user can use a keyword to dynamically generate a photo album for viewing.

U.S. Pat. No. 6,813,618 disclosed a system and method for acquisition of related graphical material in a digital graphics album. The patent uses text search to achieve the object of finding a graphic with another graphic. The user can search the network to find the related images.

To use the graphical analysis in search, the system requires the capability of graphical analysis. Although the user does not need to annotate each picture, the user can only search for graphics, and the user must first find the graphic to use for the basis for the search; therefore, it is difficult to precisely analyze the graphical contents. The article "An active Learning Framework for Content-Based Information Retrieval" in Multimedia, IEEE Transactions on Vol. 4, Issue 2, June 2002, pp. 260-268, disclosed a content-based information retrieval technique to construct an attribute tree for marking the images.

There are several methods using voice search, including direct comparison between the search condition and the annotated original voice data, or using voice recognition to transform the voice into N-gram combination to construct an index vector, and then performing voice indexing. The former requires a large amount of time in comparison when the data volume is large, and the latter is restricted by the language-dependent characteristics.

Although all the above four types of multimedia data annotation and retrieval technologies are used, all these technologies have their respective issues as stated above, and are language-dependent, therefore, the user is restricted to the use of certain languages or voices.

It is, therefore, imperative to provide a simplified data management method, a fast mechanism to search for multimedia data, and a voice and language independent indexing and searching method.

SUMMARY OF THE INVENTION

The present invention has been made to overcome the above-mentioned drawback of the conventional multimedia data management. Examples of the present invention may provide a method and an apparatus for multimedia data management.

The present invention uses syllable-transformed patterns and eigen-image analysis to search speech annotated images. For digital photo with speech annotation, the present invention may provide a novel indexing and search technique based on the image-like pattern transformed from the recognized syllable candidate. This technique also provides a mechanism to transform voice into code to achieve the language independent search.

The multimedia data management method of the present invention may include the following three steps. The first step is to use an automatic speech recognizer to transform the captured annotated eigen-voice into an image-like pattern. The second step is to construct an indexing database using the eigen-image processing. The third step is to use the natural speech to search the multimedia data during the search.

Based on the above method, the present invention may provide an apparatus for multimedia data management, including a multimedia data index production module, and a multimedia data search module. The multimedia data index production module transforms the captured annotated eigen-voice into an image-like data, and captures the eigen coefficients of the image-like data to construct an index database. The multimedia data index search module uses the natural speech to search the multimedia data.

When the present invention is applied on the speech annotations of 1055 collected digital photos, the present invention achieves better correctness in index search with a shorter search time in comparison with the conventional methods, such as index search by syllables, characters, and words.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 7A to FIG. 7E show the process of constructing the index from the recognition result.

DETAILED DESCRIPTION OF THE PREFERRED EMBODIMENTS

The following describes the method and apparatus for multimedia data management of the present invention. In the description, the apparatus for multimedia data is described by the modules. A module, especially the functionality of the module, can be realized by hardware, software, or a combination of hardware and software.

Figure 1B:
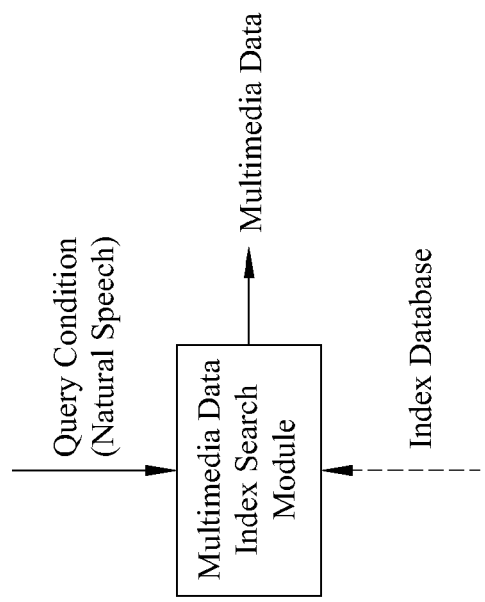
FIG. 1A and FIG. 1B show a flowchart illustrating the method for multimedia data management of the present invention.
Figure 1A:
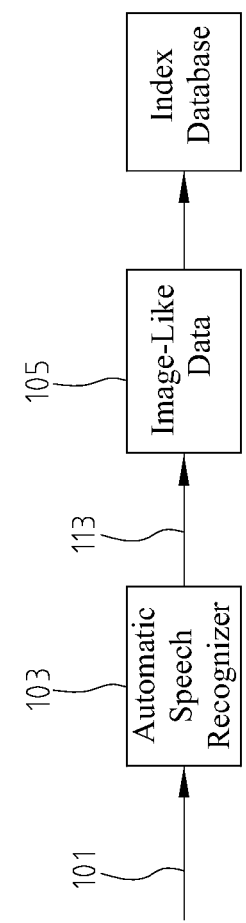

FIG. 1A and FIG. 1B show the apparatus and the operation flowchart of the multimedia data management of the present invention. The multimedia data management apparatus includes a multimedia data index production module, as shown in FIG. 1A, and a multimedia data index search module, as shown in FIG. 1B. In FIG. 1A, the multimedia data index production module uses an automatic speech recognizer 103 to generate a recognition result, such as a syllable matrix 113, for the captured annotated eigen-voice 101. Then, the recognition result is transformed into an image-like data 105. An eigen-image processing method is used to construct an index database. In FIG. 1B, the multimedia data index search module uses natural speech to search the multimedia.

Figure 2:
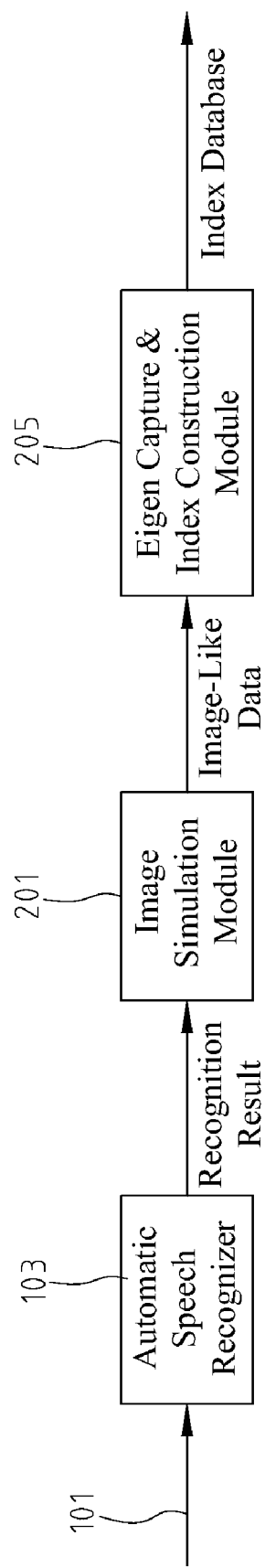
FIG. 2 shows a schematic view of a detailed block diagram of the multimedia data index production module of the present invention.

FIG. 2 shows a schematic view of a detailed block diagram of the multimedia data index production module. The multimedia data index production module includes an automatic speech recognizer 103, an image simulation module 201, and an eigen capture and index construction module 205. Automatic speech recognizer 103 recognizes captured annotated eigen-voice 101 and generates a recognition result. Image simulation module 201 first computes the resemblance score for the recognition result, and then transforms the recognition result into an image-like data according to the resemblance score. Eigen capture and index construction module 205 captures the eigen coefficients of the image-like data, and then quantifies the eigen coefficients to construct the index database. The construction of index database solves the time-consuming problem due to the comparison when the amount of image-like data is large.

Figure 3:
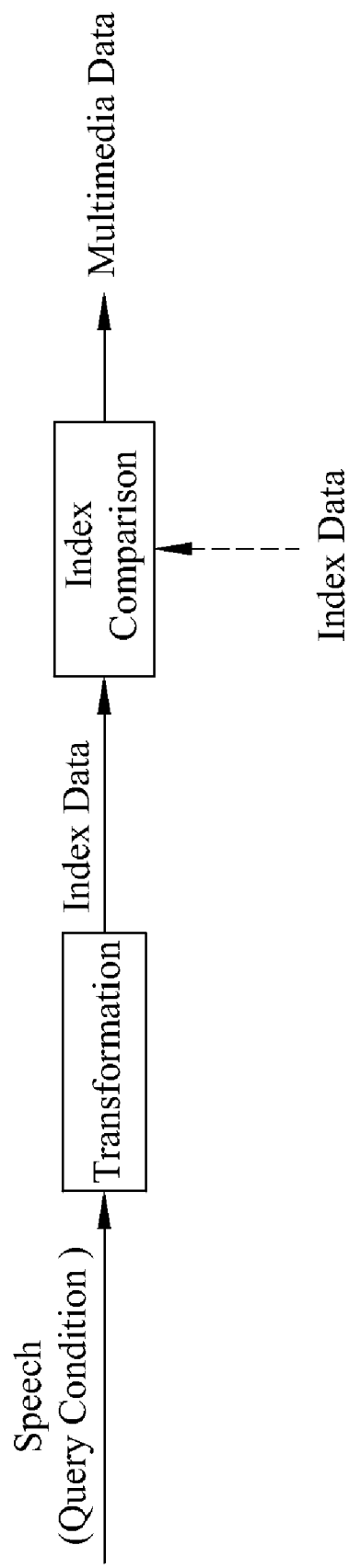
FIG. 3 shows a flowchart of the searching multimedia data by natural speech, as shown in FIG. 1B.

FIG. 3 shows the flowchart of the multimedia data index search of FIG. 1B. As shown in FIG. 3, the multimedia data index search module first inputs the search condition by speech, and transforms the search condition into an index data. Then, the comparison is made between the index data and the indexing information in the index database to find the corresponding multimedia data matching the search condition.

The main purpose of the speech recognition is to use the computer to recognize the natural speech so that the computer can further execute the corresponding task. When the natural speech is digitized by the analog-to-digital converter, and stored in the computer, the speech recognizer will compare the input test speech sample with the previously established speech recognition model to find the best match so that the test speech sample can be understood.

Before using the automatic speech recognition, the probability and statistic method is used to establish a recognition model from the collected language and text data required for speech recognition, including a language model and a phonetic model.

Figure 4:
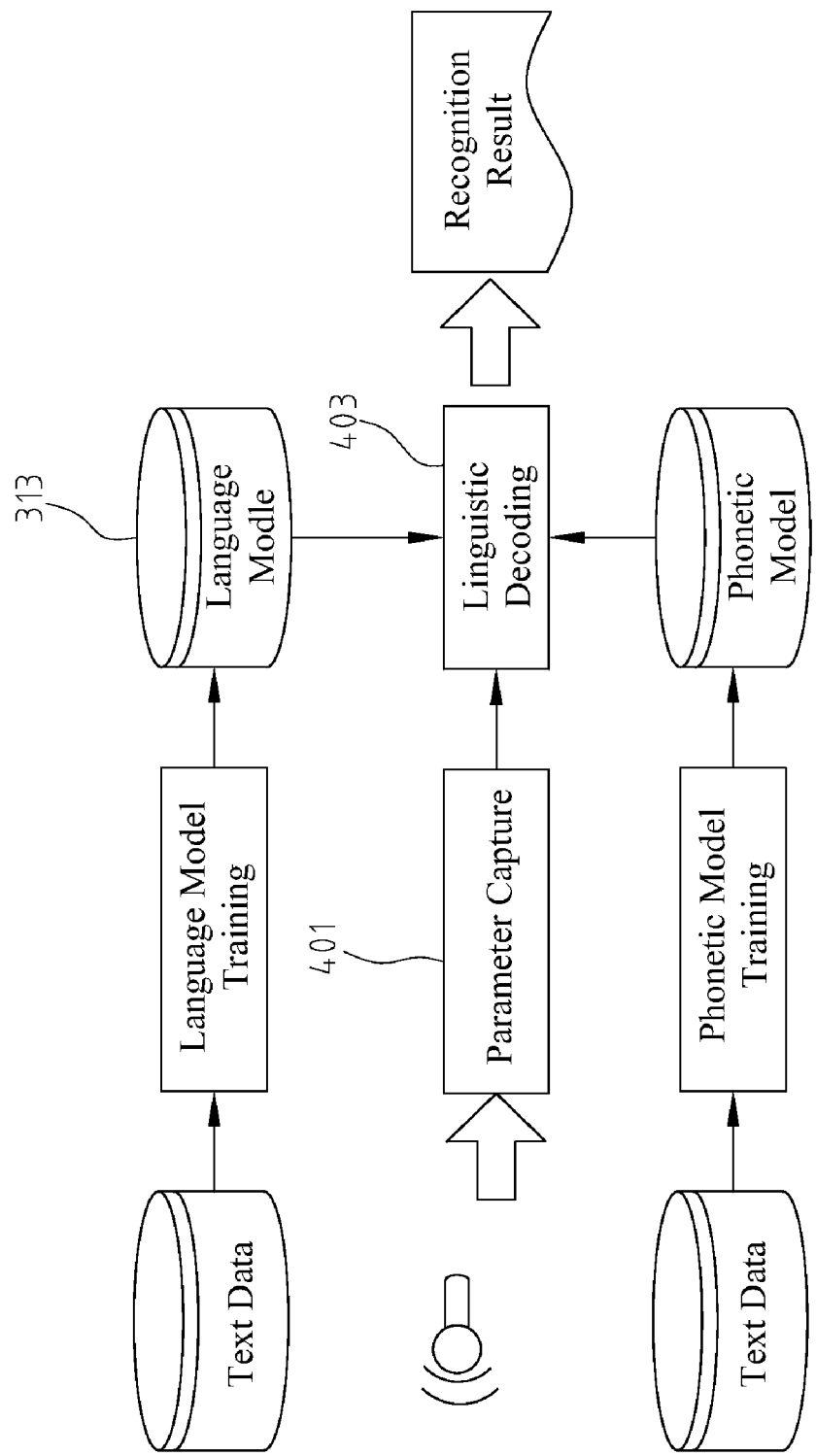
FIG. 4 shows an automatic speech recognition method.

FIG. 4 shows the method of automatic speech recognition. When the speech recognizer receives the speech, a parameter capture 401, such as Mel-frequency cepstral parameter, is performed. Then, a dynamic search 403 is performed to compare with the previously established language model and phonetic model to find speech recognition result.

The recognition result is used to understand the annotated content of the image. There still exists speech recognition error in the current speech recognition technology. The error includes statistical deviation leading to recognition model confusion, as well as common pronunciation confusion, such as "b" and "p", "ee" and "chee", and so on.

Therefore, the present invention uses the syllable-based recognizer to effectively establish the index database with all the syllables defined by the recognizer. Also, a confusion matrix is established with all the defined syllables to translate the syllables into the corresponding syllable scores for measuring the confusion against other syllables. To avoid error, the present invention uses the best n results as the candidates, called n-best syllable candidates, where n is a natural number.

Figure 5:
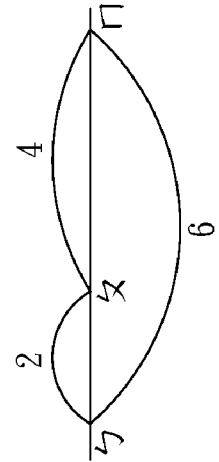
FIG. 5 shows an embodiment of defining a syllable by speech recognizer.
Figure 5:
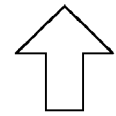
Figure 5:
Figure 5:
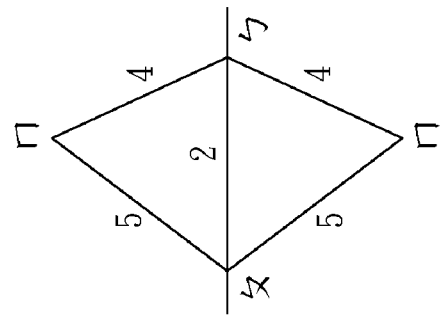

If each syllable is treated as a pixel in an image, the recognition result of the speech is like an image with colors displaying various shades and similarity relationship. The present invention uses the multidimensional scaling (MDS), as shown in FIG. 5, to establish the distance matrix between each pair of data. Then, the distance in the recognition result is described by the multidimensional space. Through the coordination transformation of the matrix, the distance is displayed as linear relationship. So that, the similarity (the distance relationship) is described by the color depth of gray level in an image. This achieves the transformation of speech into image-like data.

Figure 6:
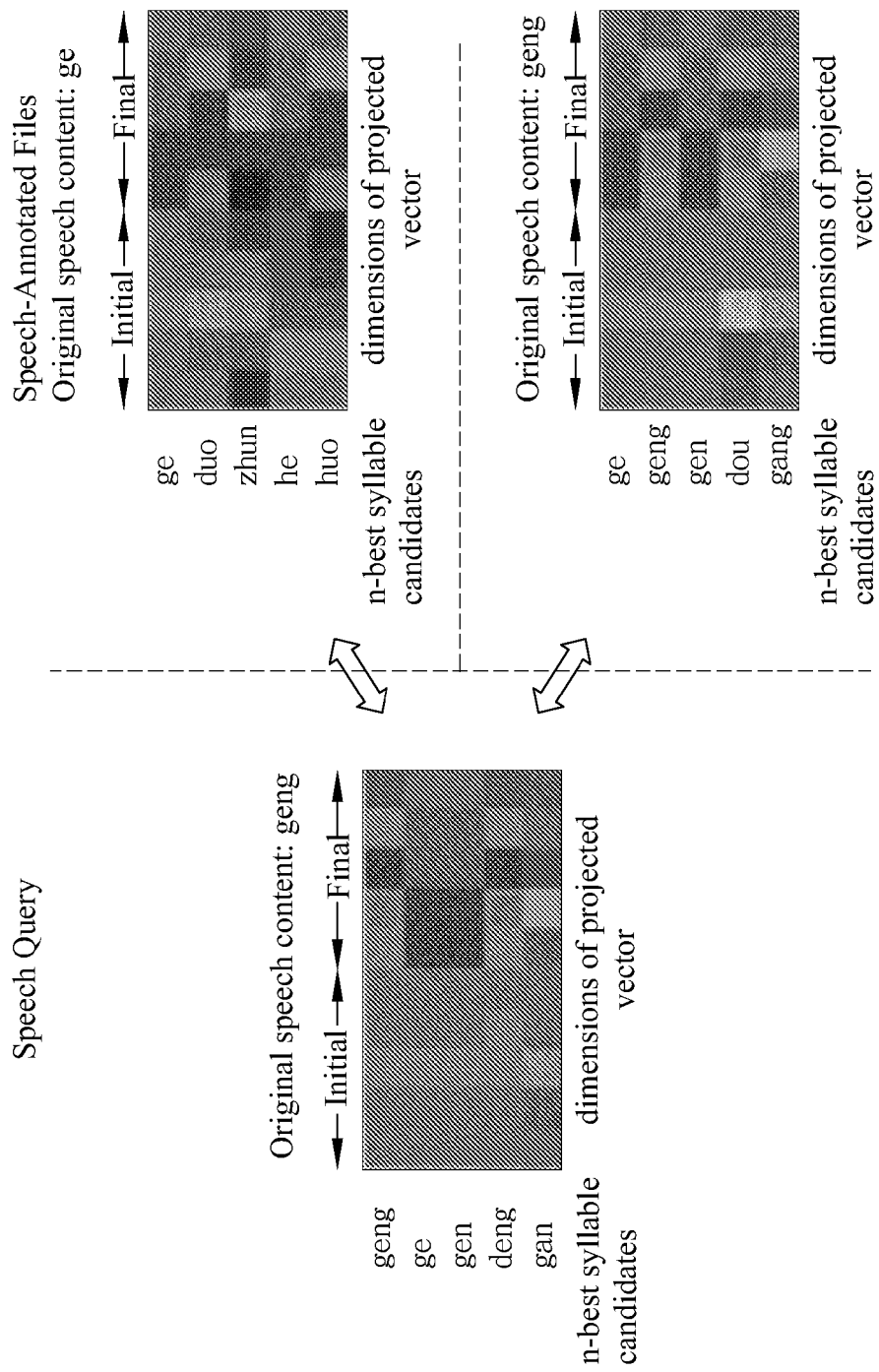
FIG. 6 shows the use of MDS to project the non-linear relation between the distance matrix of syllable pairs to the linear dimension description.

FIG. 6 shows a schematic view of an embodiment with the visual property of the image-like data. In FIG. 6, the image-like data of the n-best syllable candidates of syllable "geng" in the speech-annotated file is more similar to the image-like data of the n-best syllable candidates of the query syllable "geng" than the image-like data of the n-best syllable candidates of "ge". As shown in FIG. 6, although errors may occur in the speech recognition of the syllable "geng" in the speech-annotated file, the technique for transforming syllable to image-like data of the present invention can still match the query syllable and the correct speech-annotated syllable during the search. In other words, the search technique of the present invention can match the syllable "geng" for the speech-annotated syllable with the query syllable "geng".

FIG. 7A and FIG. 7E show an embodiment of the index construction from the recognition result. FIG. 7A shows the syllables of the recognition result. FIG. 7B shows the transformation from the n-best syllable candidates into an image-like data, and the division of the image by using a syllable candidate as a unit is shown in FIG. 7C. The analysis of the eigen-image of the divided image is further performed. The resulted image-like eigen value is a multidimensional vector, as shown in FIG. 7D. Finally, the image-like data with the similar eigen value are clustered as a codeword sequence, as shown in FIG. 7E. All the codeword sequences are collected to construct a codebook.

The speech-annotated and query speech can be transformed into a codeword sequence through the above process. The present invention uses term frequency and inverse document frequency (tf×idf) to construct a vector index. The vector index represents the information of annotated content. When the user uses speech to input a query condition, the same process is applied to transform the query condition into a vector dimension data. During search, the inner product of the query speech vector and the vector index in the database is computed for comparison, and the matched result is returned to the user.

The analysis of eigen-image is performing the principal component analysis (PCA) on the image data. The advantage is to extract significant feature of the transformed image-like data, as well as to reduce the noise data interference. The PCA can be implemented in many ways. Without the loss of generality, the following working example uses the covariance matrix estimation and singular value decomposition (SVD) for description.

The major purpose of SVD is to project all the dimensions of the image vector onto a single latent space with significantly reduced dimensionality.

Figure 8:
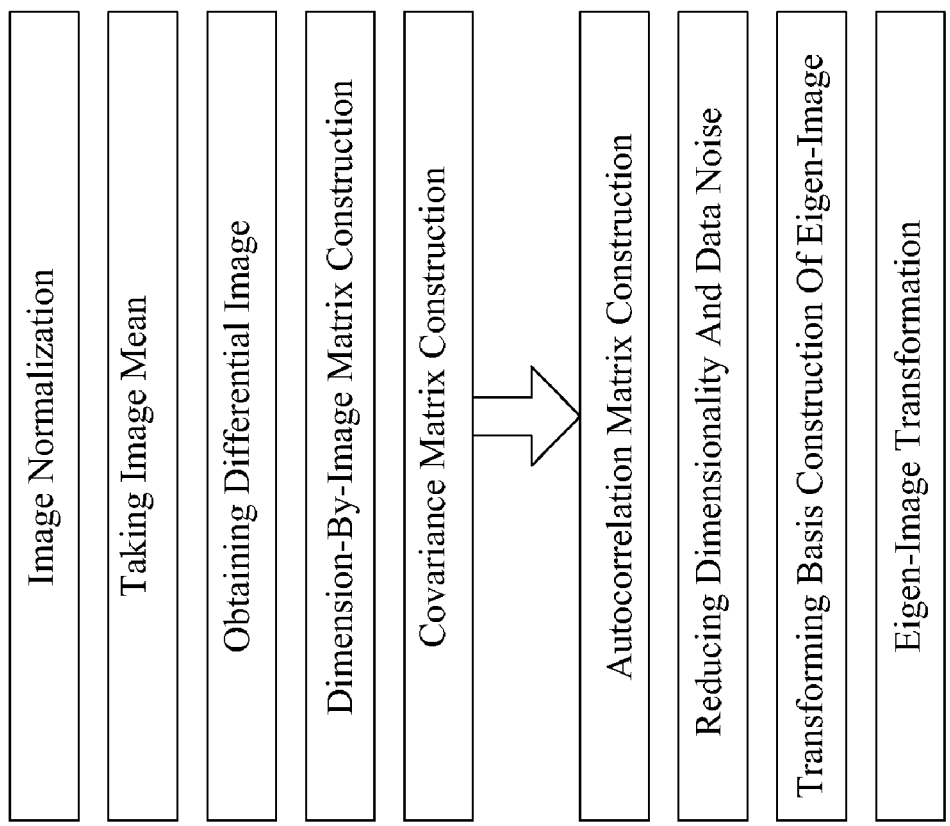
FIG. 8 shows the computation of covariance matrix estimation and singular value decomposition.

As shown in FIG. 8, the covariance matrix estimation includes image normalization, taking image mean, obtaining differential image, dimension-by-image matrix W construction, covariance matrix construction. The SVD includes obtaining the autocorrelation matrix computation of W, reducing dimensionality and data noise, transforming basis construction of eigen-image U, and U-based eigen-image transformation.

The experiments show that the present invention has less data dimensionality, faster search speed, and 16.26% of improvement in search.

In summary, the present invention provides a method and an apparatus for multimedia data management, including adding speech annotation to multimedia data and using syllable image-like data to construct index and search multimedia data. The speech data are processed and a syllable matrix is constructed. The similarity computation is used to estimate the syllable score to transform the recognized result into an image-like data. Finally, the eigen-image is used to construct index, and through the comparison of annotation and the query speech, the precision rate of matching in finding multimedia data is improved.

Based on the speech annotation, the index construction for multimedia data must first extract the feature of the speech, and the n-best syllable candidates are generated through the automatic speech recognizer. Then, the image-like transformation transforms the n-best syllable candidates into image-like data. Through the eigen-image analysis, the features are extracted and the noise reduced. Then, the similar syllables are clustered to construct codeword and codebook. Finally, each input speech passes through the above process to transform into a codeword sequence, which is used to construct an index by the widely used tf×idf statistic method.

During search, the input speech query passes through the same process to generate vector index, and compared with the index in the database to find out the matching multimedia data.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for multimedia data management, comprising the steps of:
   generating a recognition result for a speech-annotation feature through an automatic speech recognizer;
   obtaining n-best syllable candidates of said speech-annotation feature from said recognition result, said n being a nature number;
   establishing a confusion matrix for said n-best syllable candidates, said confusion matrix comprising a matrix of similarity scores, each similarity score measuring similarity of each syllable candidate against one of said n-best syllable candidates;
   transforming said confusion matrix into an image with each pixel of said image having a gray scale representing the similarity measured by a corresponding similarity score;
   constructing an index database by capturing eigen-images from said image using an eigen-image processing method; and
   searching for said multimedia data using said index database with natural speech as input.

2. The method as claimed in claim 1, wherein said step of constructing said index database further includes:
   extracting one or more feature parameters of said image; and
   quantizing said feature parameters and completing index construction for said index database.

3. The method as claimed in claim 2, wherein said step of quantizing feature parameters and completing index construction further includes:
   quantizing each eigen-image captured by said eigen-image processing method into a multidimensional vector-data; and
   clustering the multidimensional vectors into a codeword sequence, and collecting all codeword sequences into a codebook.

4. The method as claimed in claim 1, wherein said step of searching for said multimedia data with natural speech as input further includes:
   inputting speech as a query condition, and transforming said query condition into an index data;
   comparing said index data to index information of said index data in said index database; and
   finding corresponding multimedia data matching said query condition.

5. The method as claimed in claim 1, wherein said automatic speech recognizer is a syllable-based speech recognizer.

6. The method as claimed in claim 1, wherein said eigen-image processing method is a principal component analysis of said image.

7. An apparatus for multimedia data management, comprising:
   a multimedia data index production module having:
      an automatic speech recognizer for generating a recognition result from a speech-annotation feature, said recognition result including n-best syllable candidates of said speech-annotation feature, said n being a natural number;

an image simulation module for establishing a confusion matrix for said n-best syllable candidates and transforming said confusion matrix into an image, said confusion matrix comprising a matrix of similarity scores, each similarity score measuring similarity of each syllable candidate against one of said n-best syllable candidates, and each pixel of said image having a gray scale representing the similarity measured by a corresponding similarity score; and an eigen-image capture and index construction module for constructing an index database by capturing eigen-images from said image using an eigen-image processing method; and a multimedia data index searching module, for searching for said multimedia data using said index database with natural speech as input.

8. The apparatus as claimed in claim 7, wherein each index in said index database is a codeword sequence.

9. The apparatus as claimed in claim 7, wherein said automatic speech recognizer is a syllable-based speech recognizer.

* * * * *